Jan. 27. 1925.  H. C. BENNETT ET AL  1,524,503
TRAILER COUPLING
Filed June 4, 1923
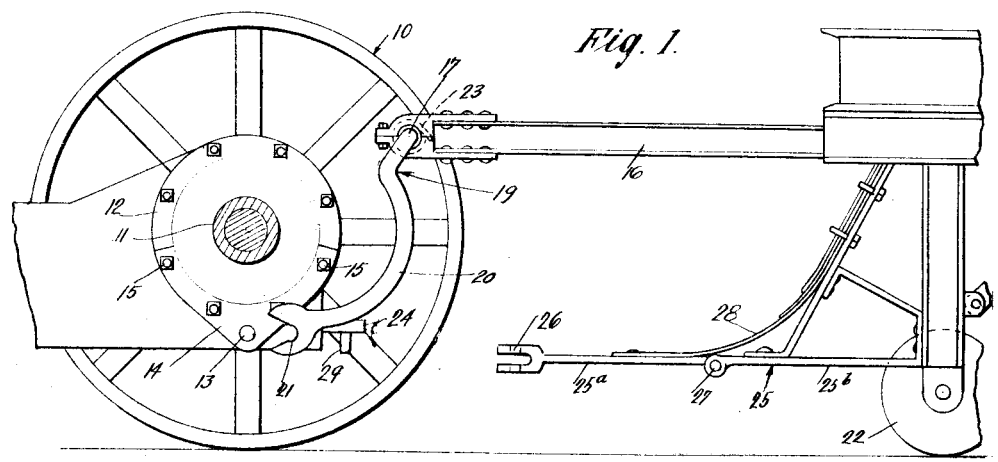
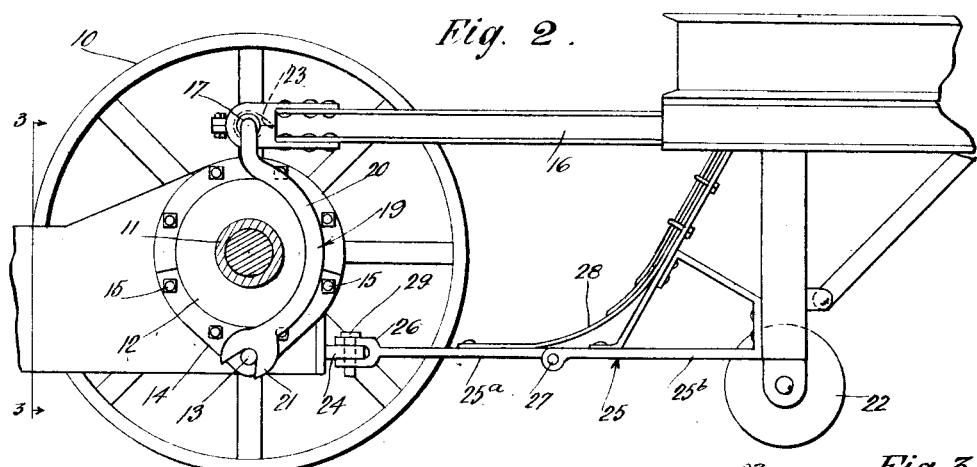
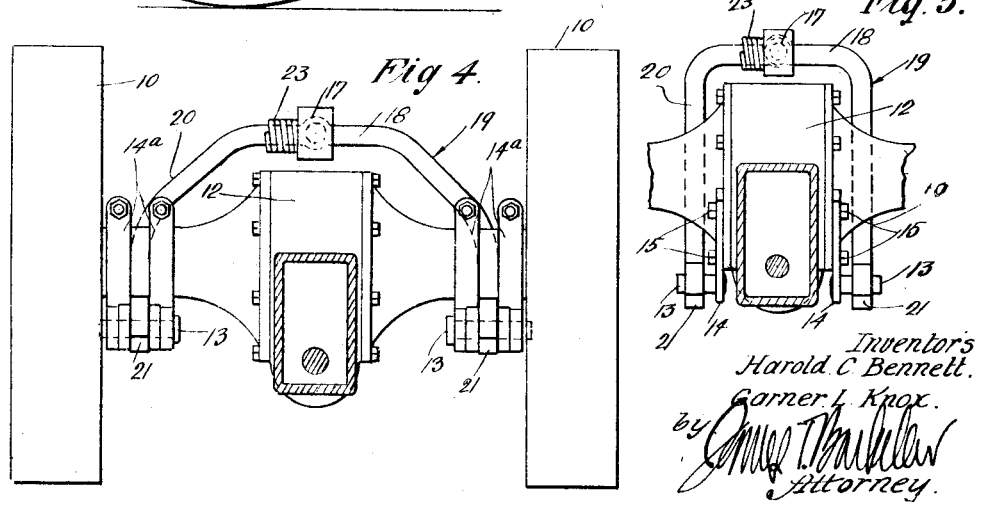
Inventors
Harold C. Bennett.
Garner L. Knox.
Attorney Patented Jan. 27, 1925.

1,524,503

UNITED STATES PATENT OFFICE.

HAROLD C. BENNETT AND GARNER L. KNOX, OF LOS ANGELES, CALIFORNIA.

TRAILER COUPLING.

Application filed June 4, 1923. Serial No. 643,229.

*To all whom it may concern:*

Be it known that we, HAROLD C. BENNETT and GARNER L. KNOX, citizens of the United States, residing in Los Angeles, county of Los Angeles, State of California, have jointly invented new and useful Improvements in Trailer Couplings, of which the following is a specification.

This invention relates to trailer couplings and more particularly to couplings adapted to two wheeled trailers, the forward ends of which are supported by the towing vehicles. When uncoupled, the weight supporting and draft members carried by the trailer extend in a lower plane than that of the complementary members on the towing vehicle and therefore it is an object in this invention to provide for the automatic elevation of the trailer carrying coupling members to the plane of and into engagement with the complementary members on the towing vehicle. This automatic elevation is caused by the coaction of certain coupling elements as the towing vehicle and trailer are being brought together by either backing up the towing vehicle to the trailer or pushing the trailer towards the towing vehicle.

It is ordinarily desirable that such of the trailer weight as is supported by the towing vehicle be concentrated at a point or points where the strains of weight and draft are most directly transmitted to the rear wheels of the towing vehicle, and we have therefore utilized the axle housing or differential casing of the towing vehicle as the supporting structure for the coupling mechanism, although in its broader aspects it will be understood that the invention may not necessarily be limited to being specifically so mounted.

A coupling device of the type described has a dual function, that is, in addition to forming a draft connection between the vehicle, it imposes the weight of the forward end of the trailer on the towing vehicle and we have shown our coupling device as including two tongue members, one for accomplishing the imposition of weight and the other the draft connection, each having a point of connection with the towing vehicle below the rear axle thereof.

Other objects and features of novelty will be best understood from the following description of a specific embodiment of the invention as illustrated in the accompanying drawings in which—

Fig. 1 is a longitudinal elevation, with parts in section, showing the trailer about to be coupled to the towing vehicle;

Fig. 2 is a similar view showing the two vehicles in coupled relation;

Fig. 3 is a vertical section on line 3—3 on Fig. 2; and

Fig. 4 is a similar view showing a modified structure.

We have shown at 10 the rear wheels of the towing vehicle and at 11 its rear axle housing with its differential casing 12 located centrally thereof.

Supporting members or pins 13 are carried by plates 14 and may be suitably affixed to the structure of the towing vehicle in various ways. In the specific embodiment illustrated in Figs. 1 to 3, we have utilized casing bolts 15 as a convenient means for rigidly securing plates 14 to the differential casing, pins 13 extending from the opposite sides of the casing and being disposed substantially parallel to and beneath the axle housing 11.

Trailer tongue 16 has universal joint connection at 17 with the cross bar 18 of yoke 19, whereby the yoke is capable of being pivotally swung from the position of Fig. 1 to that of Fig. 2 and also allowing the yoke limited transverse, lateral swing when subjected to torsional strain arising from passage of the coupled vehicles over uneven ground.

Yoke arms 20 are forked at 21 to engage pins 13 and are of arcuate form in order that they may clear the housing 11 when swung into the position of Fig. 2, thus giving the yoke the desired long radius of swinging action and allowing joint 17 to assume a position in approximate vertical alignment with axle housing 11 and pin 13. The front end of the trailer, when uncoupled, is supported by suitable means such as wheels 22, and springs 23 hold yoke 19 in the position of Fig. 1 to bring forks 21 in approximate horizontal alignment with pins 13. When it is desired to effect a coupling, the towing vehicle is backed into the trailer, whereupon pins 13 engage the ends 21 of arms 20, and continued backing movement swings the yoke in a counter-clockwise direction, as viewed in Fig. 1, and hence raises the tongue 16 and the forward end of the trailer to the position of Fig. 2, and shifts their weight to the structure of the towing vehicle at a point below its axle housing.

The application of the trailer weight to the towing vehicle at the point below its rear driving axle makes that weight exert a force immediately tending to oppose any rising of the front end of the towing vehicle. If the front end rises the pivotal point 13 is immediately moved forward of a position directly under the rear driving axle as will be obvious and the trailer weight then exerts a force just in proportion as the front end rises to oppose that rising and tends to return the front end down.

In Fig. 4 we illustrate pins 13 mounted on yokes or clamps 14ª around the axle housing 11 close to wheels; the weight carrying yoke 19 being spread accordingly wider.

Various means may be employed to accomplish the draft connection of the coupling and we have here illustrated a typical arrangement wherein an atachment member 24 extending from casing 12 below the axle comprises the towing vehicle element, and the draft bar or tongue 25, forked at 26, comprises the trailer element. Draft bar 25 may consist of members 25ª and 25ᵇ hinged together at 27 and normally held in horizontal alignment by spring 28 which may be shaped and secured in a manner to allow pivotal movement between the draft bar members when the supporting member 24 is being backed into engagement with port 26. This engagement takes place while the forward end of the trailer is being lifted by the engagement of pins 13 with yoke 19, and the draft connection is completed by manually connecting the members 24 and 26 by such means as pin 29.

The draft connection just described prevents subsequent relative longitudinal movement between the towing vehicle and the trailer, and hence maintains the associated trailer weight supporting elements of the coupling substantially in the position of Fig. 2. However, yoke 19 may swing at joint 17 in a vertical plane substantially parallel to the axle housing to allow for torsional movement, as previously described, and the yoke will also swing on pivots 13 to accommodate any relative movements of vehicle and trailer due to longitudinal undulations or unevenness of the road.

While we have herein shown and described a preferred embodiment of our invention we do not wish to be limited thereto except for such limitation as a fair interpretation of the claims may import.

We claim:

1. In a coupling device adapted to couple a trailer to a towing vehicle, means for supporting the trailer on the towing vehicle embodying a swinging member pivotally attached to the trailer and extending downwardly therefrom and a member on the towing vehicle adapted to be engaged by the lower end of the pivoted member.

2. A coupling device adapted to couple a trailer to a towing vehicle, including a swinging yoke horizontally pivoted to the trailer and adapted to swing toward and from a position in vertical alignment with its pivot, draft connection between the towing vehicle and trailer, and means associated with the draft connection to limit movement of the yoke.

3. In a coupling device adapted to couple a trailer to a towing vehicle means for supporting the trailer, embodying a pair of supporting members affixed to the vehicle structure, a swinging yoke horizontally pivoted to the trailer and adapted to engage the supporting members during uniting movement between the towing vehicle and the trailer to swing the yoke toward a position in vertical alignment with its pivot.

4. In a coupling device adapted to couple a trailer to a towing vehicle means for supporting the trailer, embodying a pair of supporting members affixed to the vehicle structure, a swinging yoke horizontally pivoted to the trailer and adapted to engage the supporting members during uniting movement between the towing vehicle and the trailer to swing the yoke toward a position in vertical alignment with its pivot and elevate the forward end of the trailer.

5. A coupling device adapted to couple a trailer to a towing vehicle means for supporting the trailer, embodying a pair of supporting members affixed to the vehicle structure, a swinging yoke horizontally pivoted to the trailer and adapted to engage the supporting members during uniting movement between the towing vehicle and the trailer to swing the yoke toward a position in vertical alignment with its pivot and elevate the forward end of the trailer, and means to limit the swinging movement of the yoke.

6. A coupling device adapted to couple a trailer to a towing vehicle, embodying a pair of supporting members affixed to the vehicle structure, a swinging yoke horizontally pivoted to the trailer and adapted to engage the supporting members during uniting movement between the towing vehicle and the trailer to swing the yoke toward a position in vertical alignment with its pivot and elevate the forward end of the trailer, and draft connection means between the trailer and vehicle.

7. A coupling device adapted to couple a trailer to a towing vehicle, embodying a pair of supporting pins affixed to the vehicle structure, a swinging yoke horizontally pivoted to the trailer and having bifurcated ends adapted to encompass the supporting pins during uniting movement between the towing vehicle and the trailer to swing the yoke toward a position in vertical alignment with its pivot.

8. A coupling device adapted to couple a trailer to a towing vehicle, including a swinging yoke horizontally pivoted to the trailer and adapted to swing toward and from a position in vertical alignment with its pivot pin, and a draft connection extending from the trailer to the towing vehicle at a point below the rear axle of said vehicle, and means associated with the draft connection to limit movement of the yoke.

9. A coupling device adapted to couple a trailer to a towing vehicle, embodying a pair of supporting pins affixed on opposite sides of the differential casing of the vehicle, a swinging yoke horizontally pivoted to the trailer and having bifurcated ends to encompass the pins during uniting movement between the towing vehicle and the trailer to swing the yoke toward a position in vertical alignment with its pivot.

10. A coupling device adapted to couple a trailer to a towing vehicle, embodying a pair of supporting pins affixed on opposite sides of the differential casing of the vehicle, a swinging yoke horizontally pivoted to the trailer and having bifurcated ends to encompass the pins during uniting movement between the towing vehicle and the trailer to swing the yoke toward a position in vertical alignment with its pivot, and draft connections between the towing vehicle and trailer, and means associated with the draft connections to limit movement of the yoke after it has been swung into vertical alignment with its pivot.

11. In a coupling device adapted to couple a trailer to a towing vehicle, means for raising and supporting the trailer embodying a swinging member horizontally pivoted to the trailer, extending downwardly from its pivot, and formed at its lower end to take a pivot pin, and the pivot pin mounted on the towing vehicle adapted to be taken by the lower end of the swinging member and about which pivot pin said member may then swing upwardly and forwardly.

12. In a coupling device adapted to couple a trailer to a towing vehicle, a swinging member horizontally pivoted to the trailer and adapted to swing to and from a position substantially in vertical alignment with a pivot, a supporting member on the vehicle to support the swinging end of said swinging member, and a separate draft connection between the vehicle and trailer.

13. A coupling device adapted to couple a trailer to a towing vehicle having a rear driving axle, embodying a weight support for the trailer applied to the tractor at a point below and not behind its rear driving axle, and a draft connection applied to the towing vehicle at a point below its rear driving axle.

14. In a coupling device adapted to couple a trailer to a towing vehicle, having a rear driving axle, means for supporting the trailer on a towing vehicle applying the weight of the trailer to the towing vehicle at a point below and not behind said rear driving axle.

In witness that we claim the foregoing we have hereunto subscribed our names this 21st day of May, 1923.

HAROLD C. BENNETT.
GARNER L. KNOX.